US009701068B2

(12) United States Patent
Choiniere et al.

(10) Patent No.: US 9,701,068 B2
(45) Date of Patent: Jul. 11, 2017

(54) TRANSPARENT FIBER COMPOSITE

(75) Inventors: Paul Choiniere, Livermore, CA (US); Evans Hankey, San Francisco, CA (US); Michael K. Pilliod, San Francisco, CA (US); Peter N. Russell-Clarke, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 547 days.

(21) Appl. No.: 13/560,980

(22) Filed: Jul. 27, 2012

(65) Prior Publication Data

US 2014/0030522 A1 Jan. 30, 2014

(51) Int. Cl.
B32B 17/04 (2006.01)
B29C 70/06 (2006.01)

(52) U.S. Cl.
CPC .............. *B29C 70/06* (2013.01); *B32B 17/04* (2013.01); *B29K 2995/0026* (2013.01); *B32B 2307/412* (2013.01); *Y10T 428/2967* (2015.01)

(58) Field of Classification Search
CPC ........ C08J 5/00; C08J 5/06; C08J 5/08; C03C 1/00; C03C 17/34; C03C 2218/365; D06M 2200/40
USPC ........ 524/492, 494; 428/375, 378, 361, 365, 428/380, 403, 196, 198, 210, 212, 430; 252/8.83; 427/287; 8/115.6
See application file for complete search history.

(56) References Cited

U.S. PATENT DOCUMENTS 3,186,866 A * 6/1965 Claeys .................... C03C 25/10
156/315

5,556,673 A * 9/1996 Giraud .................... E04C 3/29
428/34.4
5,665,450 A 9/1997 Day et al.
5,733,659 A 3/1998 Iwakiri et al.
6,818,306 B2 * 11/2004 Miller .................... B29C 70/58
428/413

(Continued)

FOREIGN PATENT DOCUMENTS

EP 0728576 A1 8/1996
JP 09-207234 A 8/1997
(Continued)

OTHER PUBLICATIONS

Menta et al., Manufacturing of transparent composites using vacuum infusion process. Proc. 4th Ann. ISC Res. Symposium, Rolla, MO (Apr. 21, 2010).
(Continued)

*Primary Examiner* — Camie Thompson
(74) *Attorney, Agent, or Firm* — Polsinelli PC

(57) ABSTRACT

A method for forming a relatively transparent fiber composite is disclosed. In one embodiment, the relatively transparent fiber composite can include glass fibers with a relatively low amount of iron oxide. In another embodiment, the transparent fiber composite can include a selected resin, a sizing and glass fibers where the index of refraction of the glass fibers, the sizing and the resin can be similar, within a tolerance amount. In yet another embodiment, the resin can be relatively clear and free from pigments and tints. In one embodiment, the glass fibers can be formed into a mat. In another embodiment, glass fibers can be chopped or milled and a relatively transparent part can be formed through injection molding.

17 Claims, 10 Drawing Sheets

(56) References Cited

U.S. PATENT DOCUMENTS

| | | |
|---|---|---|
| 7,632,563 B2 | 12/2009 | Hellring et al. |
| 7,923,062 B2 | 4/2011 | Saida et al. |
| 2007/0179237 A1* | 8/2007 | Sekine ........................ 524/492 |
| 2008/0151372 A1 | 6/2008 | Ouderkirk et al. |
| 2009/0178708 A1* | 7/2009 | Higashiyama et al. ...... 136/256 |
| 2010/0091202 A1 | 4/2010 | Ostergard et al. |
| 2011/0230596 A1* | 9/2011 | Wilenski ............... C03B 37/027 |
| | | 523/466 |
| 2011/0281484 A1 | 11/2011 | Yoshida et al. |
| 2012/0088063 A1 | 4/2012 | Kozar et al. |

FOREIGN PATENT DOCUMENTS

| | | |
|---|---|---|
| JP | 2010-137582 | 6/2010 |
| WO | 03-097726 A1 | 11/2003 |
| WO | 2011/081883 | 7/2011 |

OTHER PUBLICATIONS

PCT Application No. PCT/US2013/051146—International Search Report and Written Opinion dated Sep. 27, 2013.

\* cited by examiner

TRANSPARENT FIBER COMPOSITE

FIELD OF THE DESCRIBED EMBODIMENTS

The described embodiments relate generally to relatively transparent composite materials, and more particularly to relatively transparent composites formed with fibers encapsulated in a resin.

BACKGROUND

Fiber reinforced composites are typically formed with a matrix of fibers embedded in a hardened resin. Fiber composites can be used in many products because of its relatively high strength, relatively light weight and low manufacturing costs. Common applications can be automobile body features, marine applications and swimming pools. The relatively high strength to weight ratio of fiber reinforced composites makes them a good fit for these and other applications. Glass fibers are one of the most common fibers employed to reinforce composites, which has led to the common term of "fiberglass" used to describe such composites. However, ceramic fibers can also be used to reinforce resins in a similar manner. Hereinafter, the term fiberglass is used to denote a fiber reinforced composite in general.

To form a fiberglass object, the fiber material, often in a mat form, is wetted by a liquid resin. The resin then cures into a solid either in ambient air or in elevated air temperatures. Oftentimes, the fiberglass mat can be placed into a form or mold and then the resin can be applied to the mat to create a particular shape. In most applications, the strength and cost of the fiberglass object are the key desired characteristics of the object. Cosmetic requirements are often less critical. As most fiberglass cures, the fiberglass can appear to take on a slight green hue imparted by the resin. Colored resins can be easier to handle during the manufacturing process. Many fiberglass objects can be painted or have a coverlay (an opaque or relatively opaque covering) applied to both hide the green color and provide a final finish for the fiberglass object.

It can be desirable to have low cost, high strength, relatively clear fiber reinforced composites. Relatively clear fiberglass composites can enable lightweight and strong housings that can include a clear window for either displays or even camera lenses. Non-optimal resin and fiber selection can hinder the production of relatively clear fiberglass composites. Therefore, what is desired is a reliable way to produce a relatively transparent fiber reinforced composite.

SUMMARY OF THE DESCRIBED EMBODIMENTS

This paper describes various embodiments that relate to relatively transparent fiber reinforced composites. A method for forming relatively transparent fiber-resin composites is disclosed. In one embodiment, a fiber for the composite can be selected and an index of refraction related to the fiber can be determined. A sizing can be selected for application to the fiber such that an index of refraction of the sizing can be within a tolerance amount of the index of refraction of the fiber. A resin can be selected for the composite such that an index of refraction of the resin is also within the tolerance amount of the determined index of refraction of the fiber.

A transparent fiber-resin composite is disclosed. In one embodiment, the transparent fiber-resin composite can include a glass fiber, a sizing and a resin where the sizing and the resin are selected to have an index of refraction similar to a determined index of refraction of the glass fiber. In one embodiment, the glass fiber can include less than 0.1% of iron oxide.

A method of forming a transparent fiber-resin composite by injection molding is disclosed. In one embodiment, a chopped glass fiber is selected and the index of refraction of the glass fiber is determined. A sizing for the chopped glass fiber is selected with an index of refraction similar to the index of refraction of the glass fiber. The sizing is applied to the glass fiber and a resin is selected with an index of refraction similar to the index of refraction of the glass fiber. The glass fiber is mixed with the resin and the mixture is injection molded.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION OF SELECTED EMBODIMENTS

Figure 1:
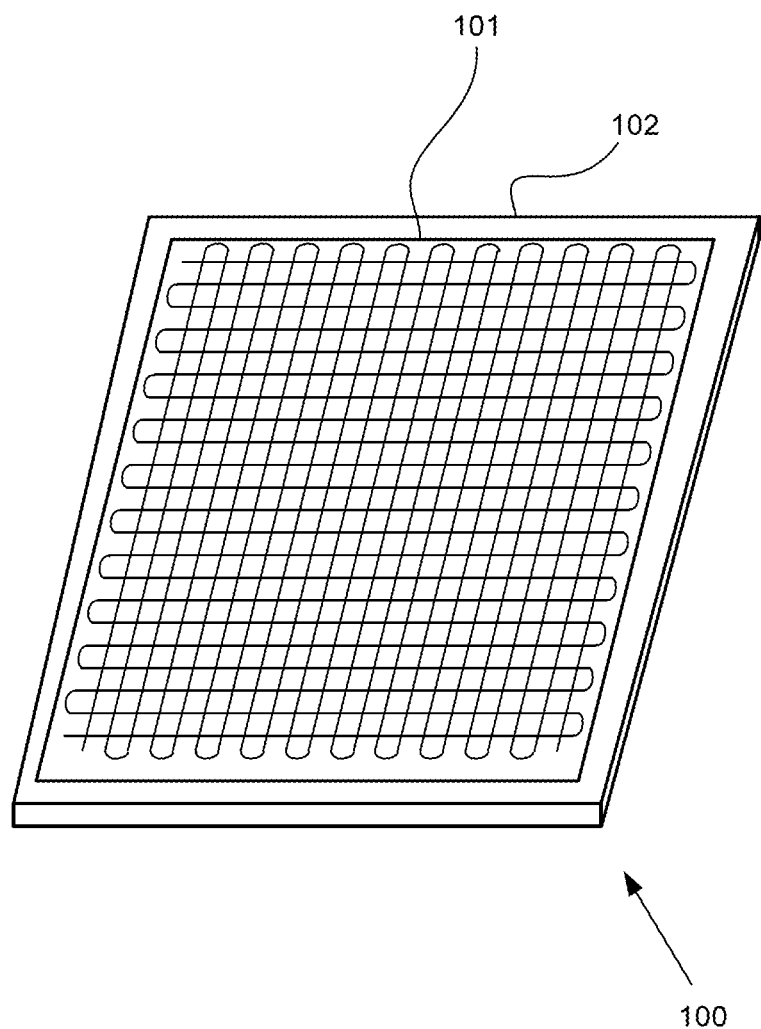
FIG. 1 illustrates a prior art fiber composite.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Fiberglass composites can be formed by embedding fibers into a resin. The fibers can be a glass or a ceramic and are often coated with a sizing which can enhance the adhesion of the fiber to the resin, as the resin cures. A relatively transparent fiberglass composite can formed by selecting appropriate fibers, resin and sizing such that these components share a relatively similar index of refraction within the composite. Other component characteristics other than the index of refraction can also be considered to further optimize the perceived clarity of the composite.

Glass fibers are one of the most common fibers used to make fiberglass. Although glass can be inherently transparent, typical glass often includes impurities that can nonetheless make the glass appear less transparent. Common glass (also referred to soda-lime glass) can include relatively significant amounts of iron oxide. One main raw component of glass is silica, which is melted to form glass and glass fibers. Iron oxide is typically found in significant amounts near silica, thus, is often melted with the silica during glass formation. The resulting glass (and glass fibers) can have a green tint from the iron oxide. Thus, selecting glass fibers with a relatively low iron oxide content can help make the glass fibers (and therefore the resulting fiberglass composite) more transparent. Also, transparent resins, without pigments or tints, should be preferentially selected over tinted or colored resins, to enhance the clarity of the composite.

In one embodiment, relatively clear fiberglass composites can be formed by selecting constituent components to have a relatively similar index of refraction. That is, the resin and the fiberglass within the resin should have the same index of refraction, at least within a value of 0.01 (i.e., the difference between the index of refraction of the resin and the fiberglass is preferably less than 0.01). In one embodiment, the difference between indices of refraction can be less than 0.005.

Fibers used in composites are typically in one of two forms. In a first form, as shown in FIG. 1, fibers, are typically bundled into tows, and then woven into mats. This form works well for larger objects and objects that can be put together in a mold. Using fiberglass mats to form composites, however, may not enable volume production. Because of their available size, fiberglass mats are suited for larger composites. Fiberglass mats are used to form the hull and cabin in boat manufacturing and also to form lightweight and strong automobile bodies used in auto racing. Fiberglass mats, can require a significant amount of hand work and skill. A skilled tradesman can fit the fiberglass mats into a mold and then carefully apply the resin onto the mat, saturating the fibers and carefully working out bubbles from within the resin and between mat layers.

Injection molding techniques, in contrast, can be well suited for high volume production. Fiberglass can be used with injection molded resins to form high strength, relatively transparent composites without the hand labor associated with fiberglass mat. Chopped fibers (chopped fiberglass) can be used with resins to form relatively transparent composites though an injection molding process. Chopped fibers can be formed by cutting strands or tows of fibers. In one embodiment, chopped fibers can range from approximately 0.25 to 0.50 inches. In another embodiment, relatively smaller pieces of fibers can be used. These relatively smaller fibers are often called milled fibers. For uniform strength and uniform clarity, the fibers in general and chopped fibers in particular can be evenly distributed in the resin. Chopped fibers can be mixed into the resin at any time prior to injection.

FIG. 1 is a simplified diagram showing a fiberglass composite 100, in accordance with the specification. The fiberglass composite 100 can include fiberglass mat 101 encapsulated in a resin 102. Although only a single mat 101 is shown, multiple mats may be used to increase strength of the fiberglass object. In one embodiment, fiberglass mats can be made from small individual glass fibers. The fibers can be bundled into "tows" and the tows can be woven into mats. Glass fibers, when viewed individually, in tows or in mats, and can appear bright white. Actually, the fibers are clear, being made from glass, but their relatively small diameter can disperse light and cause the white appearance. When the fibers are wetted by the resin, the white fibers often appear relatively translucent or clear. In other embodiments, the mat 101 can be composed of relatively clear ceramic fibers.

Typical resins used for fiberglass composites carry a pigment, often green in color. Such resins can be relatively low cost to produce and the green color can allow the resin to be more easily seen and can help ease handling while forming a composite. To hide the green color, a composite formed with a colored resin can be painted or have an overlay applied to hide an objectionable color.

Figure 2:
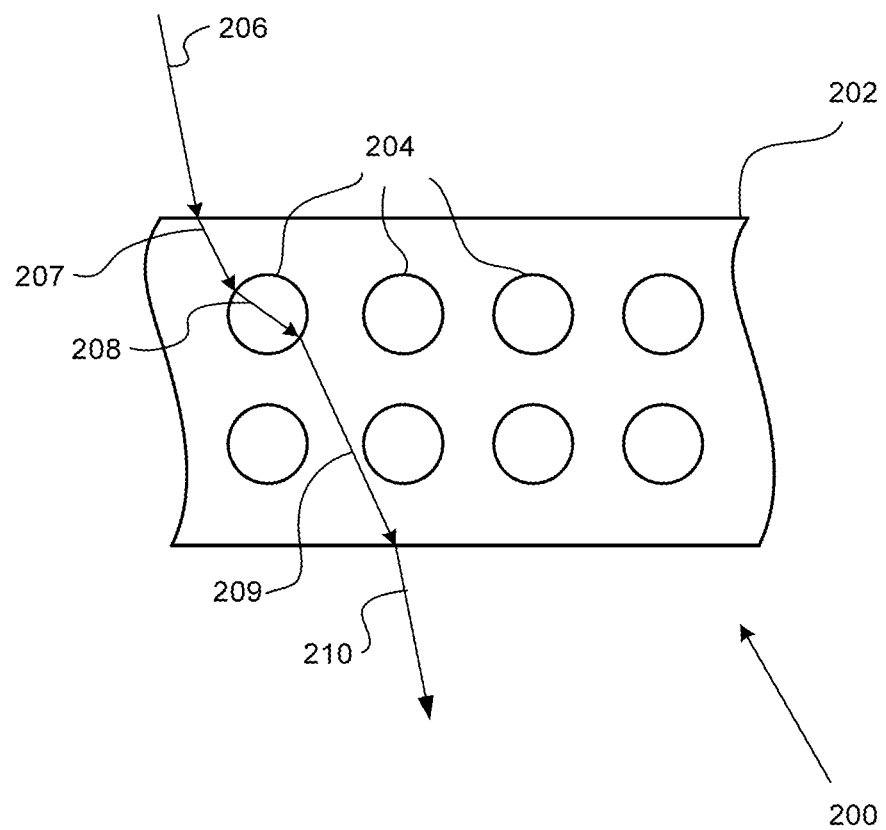
FIG. 2 is a simplified illustration of a prior art composite.

A first step to producing a relatively transparent fiberglass composite can be to select a resin that is relatively clear and without pigment. Then clear fibers, when wetted by and encapsulated in a clear resin can appear relatively transparent. The fibers, however, may still be noticeable and may cause the resulting composite to be blurred. FIG. 2 is a simplified illustration of a prior art composite 200. Prior art composite 200 can include resin 202 and fibers 204. As is well known, light travels at different speeds within different materials. The relative changes in the speed of light within different materials can be described by an index of refraction. Generally, the greater the index of refraction, the slower the speed of light within a material. When light travels between materials with different indices of refraction, the path of light can change. This well known optical phenomenon is described by Snell's Law. Thus, dissimilar materials within a composite, such as prior art composite 200, can cause light rays to bend and can affect the overall clarity of prior art composite 200.

Light ray 206 illustrates the effect of different indices of refraction of components within prior art composite 200. As light ray 206 enters resin 202, light ray 206 bends a first amount shown in light ray 207. Light ray 207 continues to fiber 204. Since, in this example, fiber 204 can have a different index of refraction from resin 202, the resulting light ray 208 can bend with respect to light ray 207. Light ray 208 can continue through fiber 204. Eventually, light ray 208 can exit fiber 204 and can bend again with respect to light ray 208 to form light ray 209. Light ray 209 can exit resin 202 and can bend a final time shown by light ray 210.

Controlling the indices of refraction of the fibers and the resin used in composite 200 can help produce a relatively transparent composite by effectively reducing the light ray perturbation as light travels through a composite. However, an additional component of the overall composite should also be considered. Fibers in general, can have a sizing applied to improve adhesion of fiber 204 to resin 202 and to aid in the handling of the fiber 204 prior to application in resin 202. The sizing can have an adverse effect on the path of light within a composite.

Figure 3:
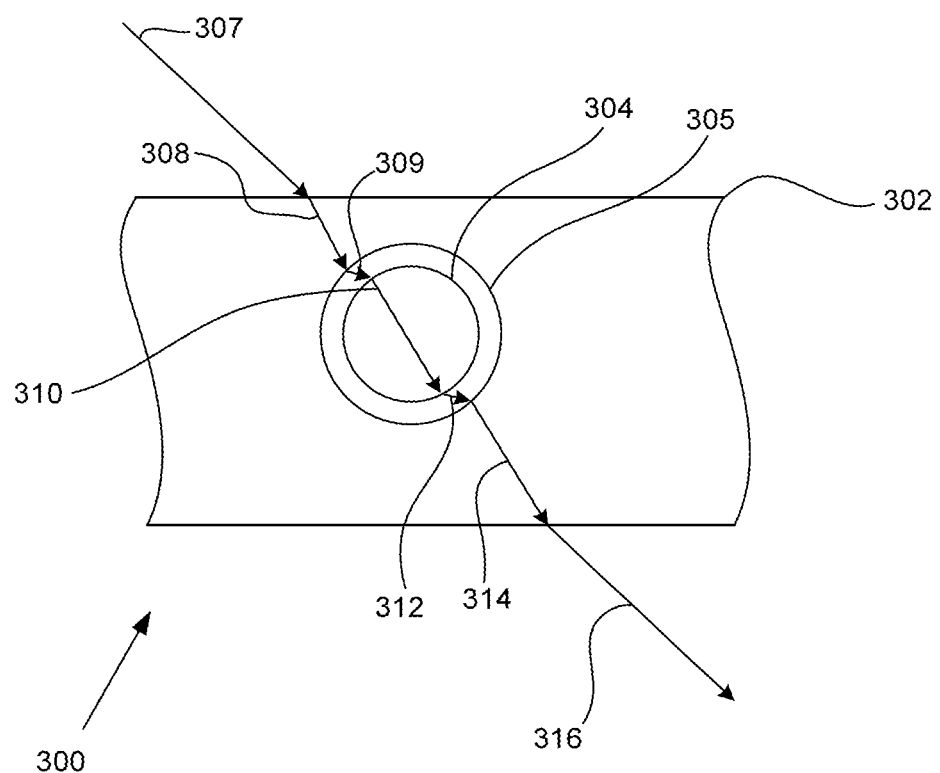
FIG. 3 is another simplified illustration of a prior art composite.

FIG. 3 is another simplified illustration of a prior art composite 300. In this example, fiber 304 can be coated with sizing 305. Since sizing 305 can have a different index of refraction compared to resin 302 or fiber 304, a path of a light ray can cause diffusion of light, causing the composite 300 to appear blurred.

Light ray 307 can enter resin 302 and bend a first amount resulting in light ray 308. Light ray 308 can encounter sizing 305 which can cause light ray 308 to bend and form light ray 309. Light ray 309 can continue to fiber 304 where the difference between indices of refraction between the fiber 304 and sizing 305 can cause light ray 309 to bend again and form light ray 310. Light ray 310 can continue and can bend again as it crosses again into sizing 305 forming light ray 312. Light ray 312 can continue and exit sizing 305 and enter resin 302. As light ray 312 enters resin 302, the resulting light ray can bend and form light ray 314. Finally, ray 314 can exit resin 302 and bend a final time forming light ray 316. As shown, the sizing 309 can cause yet another perturbation to a path of light through composite 300.

Through careful selection of the components used within a fiber reinforced composite, a relatively transparent composite can be formed. A first consideration can be the fiber. A common choice for fiber is glass fiber. Although glass fiber can appear transparent, especially when wetted, inexpensive glass fibers can include significant amounts of iron oxide. Iron oxide can be present in significant amounts where silica, a main component of glass is found. Thus, when melting silica to make glass, iron oxide often becomes incorporated with the glass. The presence of iron oxide in glass, such as glass fibers, can tint the glass (and glass fibers) slightly green. To create a relatively clearer glass fiber, the glass fiber can be relatively low in iron oxide. In one embodiment, the amount of iron oxide can be less than a predetermined amount. In another embodiment, the amount of iron oxide can be less than 0.1% by volume.

Figure 4:
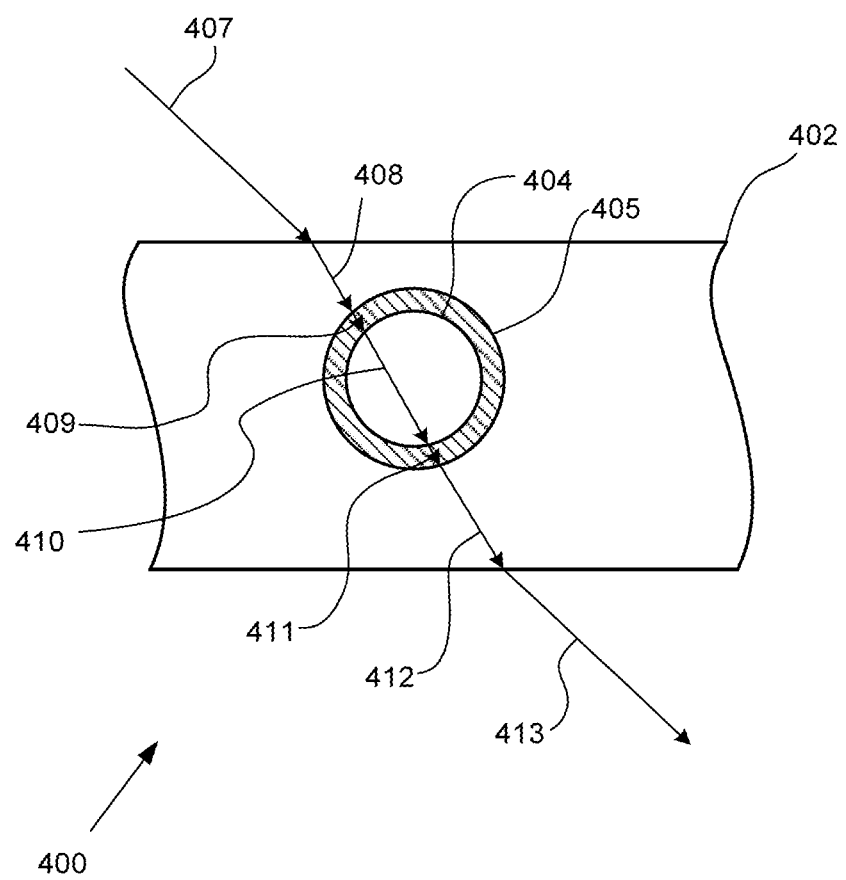
FIG. 4 is a simplified illustration of a portion of a relatively transparent composite in accordance with the specification.

A second consideration for creating a relatively transparent composite can be controlling the indices of refraction of the composite components. In particular, selecting components to have the same indices of refraction, within a predetermined amount, can reduce light path perturbation through the composite. FIG. 4 is a simplified illustration of a portion of a relatively transparent composite 400 in accordance with the specification. In one embodiment, the index of refraction of resin 402, glass fiber 404 and sizing 405 can be controlled such that all three indices of refraction can be similar and within a predetermined amount. In one embodiment, the indices of refraction of the resin 402, glass fiber 404 and sizing 405 can be within 0.01 of each other. In another embodiment, the indices of refraction can be within 0.005 of each other. Light ray 407 illustrates a typical light ray entering, relatively transparent composite 400. Light ray 407 can enter resin 402 and bend a first amount forming light ray 408. As light ray 408 travels through sizing 405 (light ray 409), through glass fiber 404 (forming light ray 410), again through sizing 405 (forming light ray 411), and again through resin 402 (light ray 412), each ray (light rays 409-412) does not significantly deviate path or bend and, in contrast to rays in FIG. 2 or FIG. 3, can travel in a relatively straight line. When light ray 412 exits resin 402, light ray 413 is formed and can bend due to the difference between the index of refraction of resin 402 and air. Clarity of composite 400 is enhanced since light travelling through the composite 400 is not dispersed, but rather can travel through relatively straight paths as shown.

Indices of refraction for the components used in the relatively transparent composite can be obtained from the manufacturer, or can be measured using laboratory equipment. Glass generally can have an average index of refraction of around 1.55. In many cases, the index of refraction of glass can be relatively difficult to modify. Because of the associated difficulty, the index of refraction of the sizing and the resin can more often be adjusted to approach the index of refraction of the glass. In other embodiments, the index of refraction of glass fibers can be adjusted to match the index of refraction of a resin or a sizing.

Figure 5:
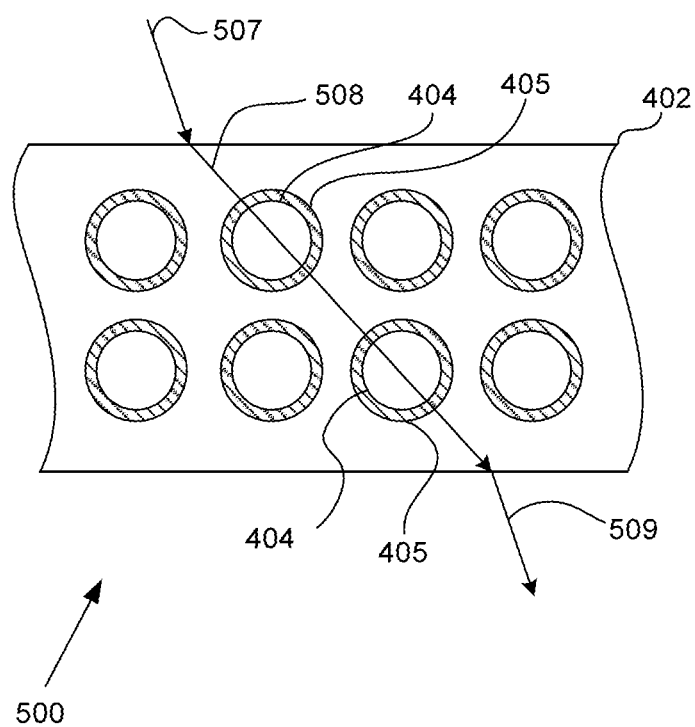
FIG. 5 is another simplified illustration of a portion of a relatively transparent composite in accordance with the specification.

The description of light transmission through a single fiber within a resin shown in FIG. 4 can be extended to two or more fibers. FIG. 5 is another simplified illustration of a portion of a relatively transparent composite 500 in accordance with the specification. In this embodiment, resin 402 can encapsulate two or more glass fibers 404. Also, in this embodiment, the indices of refraction of the resin 402, glass fibers 404 and sizing 405 can be similar, within a predetermined tolerance amount.

As light ray 507 enters resin 502 from air, light ray 508 forms and bends in accordance with Snell's Law. Notably, however, light ray 508 can travel in a relatively straight path as the light ray travels through two or more glass fibers 404 and their related sizing 405. Thus, clarity can be improved for light rays traveling through two or more glass fibers 404. FIG. 5 shows glass fibers 404 in cross section. In other embodiments, glass fibers 404 can be arranged such that glass fibers 404 alternate in orientation such as in a cross hatch pattern. The orientation of glass fiber 404, however, does not substantially change the behavior of light rays through the fiber reinforced composite. In some embodiments, the glass fibers 404 can be woven into mats.

Figure 6:
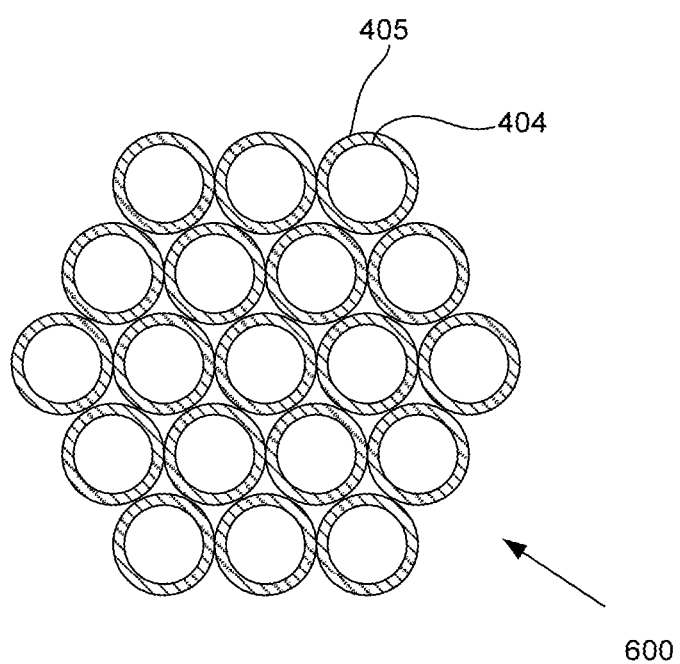
FIG. 6 is a cross sectional view of a tow of fibers, in accordance with the specification.

FIG. 6 is a cross section view of a tow 600 of glass fibers 404 in accordance with the specification. Individual glass fibers 404 can be bundled or spun together to form a tow 600. Although arranged as a tow, glass fibers 404 can still include sizing 405 to help adhesion within resin 502 and to enhance handling characteristics of fiber prior to application in a resin 402. The number of glass fibers 404 included in a tow 600 can vary, with more glass fibers 404 increasing the strength of a final composite. To enhance transparency of the final composite, resin 402 should be allowed to wet each glass fiber 404 within tow 600; that is, there should be little if any trapped air within tow 600. Trapped air can disperse the light and affect clarity since the air can have a different index of refraction compared to the resin 402, sizing 405 and glass fibers 404 used in the final composite. Thus, overall tow 600 diameter should not exceed an amount that the resin 402 can penetrate before the resin 402 loses viscosity as the resin 402 sets and cures.

In one embodiment, the diameter of a glass fiber 404 can be twelve microns. A twelve micron diameter can add strength to a composite and also allow light to easily penetrate and pass through the resulting composite. In another embodiment, the diameter of a glass fiber 404 can be less than 12 microns. Smaller glass fiber 404 sizes can help produce a relatively clearer composite. In one embodiment, glass fiber 404 diameter can be between 6 and 7 microns. Glass fiber 404 diameters within this range can strike a balance between a relatively transparent composite and increased strength of the resulting composite. Smaller glass fiber 404 diameters in general can advantageously offer less obstruction to light traversing a composite.

Figure 7:
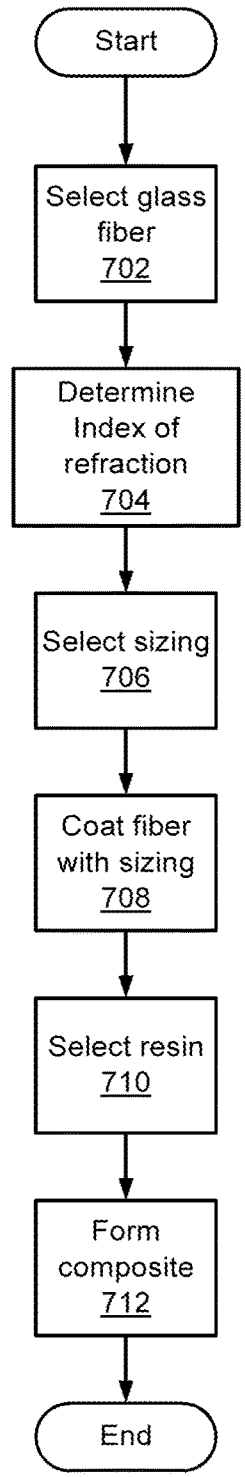
FIG. 7 is a flow chart of method steps for forming a relatively transparent fiberglass composite.

FIG. 7 is a flow chart of method steps 700 for forming a relatively transparent fiberglass composite. Persons skilled in the art will understand that any system configured to perform the method steps in any order is within the scope of this description. The method begins in step 702 when a glass fiber 404 is selected. As described above, glass fibers 404 can be selected for clarity; that is, selected glass fibers 404 can be selected to be relatively colorless by having a relatively low iron oxide content. In one embodiment, the iron oxide content can be less than 0.1% by volume. In step 704, the index of refraction of glass fibers 404 can be determined. Oftentimes, the index of refraction can be determined through the manufacturer of the glass fibers 404, through a data sheet for example. In other embodiments, glass fibers 404 can be tested with well known methods to determine the index of refraction. In step 706, a sizing 405 for glass fiber 404 can be selected. Sizing 405 can enhance the adhesion of the glass fiber 404 to a later applied resin 402. Sizing 405 can be selected to have a relatively similar index of refraction with respect to the selected glass fiber 404. In one embodiment, the index of refraction of the sizing 405 is similar to the index of refraction of the glass fiber 404, within a predetermined tolerance amount.

In step 708, sizing 405 can be applied to glass fibers 404. In step 710, a resin 402 is selected for the composite. In one embodiment, resin 402 can be selected without pigments or tints. In another embodiment, the resin 402 is selected to have a relatively similar index of refraction with respect to the glass fiber 404 and sizing 405, within a predetermined tolerance amount. In step 712, the composite is formed with the selected glass fiber 404, sizing 405 and resin 402 and the method ends.

The method steps described above for forming transparent composites can be applied to different forms of fiber composites. In one embodiment, glass fibers 404 can be formed into tows 600 and woven into mats 101. Resin 402 can be applied over the mats 101 to form composites. In another embodiment, fiber strands such as glass fibers 404 can be chopped or milled, rather than formed into mats. Chopped fibers can be formed from glass fibers or tows by cutting continuous fibers or tows into pieces that can typically range from between 0.25 to 0.50 inches in length. Milled fibers can be smaller versions of chopped fibers that can be even shorter than 0.25 inches long. Milled fibers (and in some cases chopped fibers) can be used in injection molding. That is, milled or chopped fibers can be mixed with resin and injected into molds to form a molded, relatively transparent part. In both cases, a clearer molded part can be obtained when the distribution of the glass fibers is relatively uniform within the resin. Non-uniform distribution of glass fibers can cause areas of the resulting composite to be less transparent. When viewed at the level of individual fibers, chopped fibers can appear similar to glass fibers 404 in a resin 402 as shown in FIG. 4 or FIG. 5.

Figure 8:
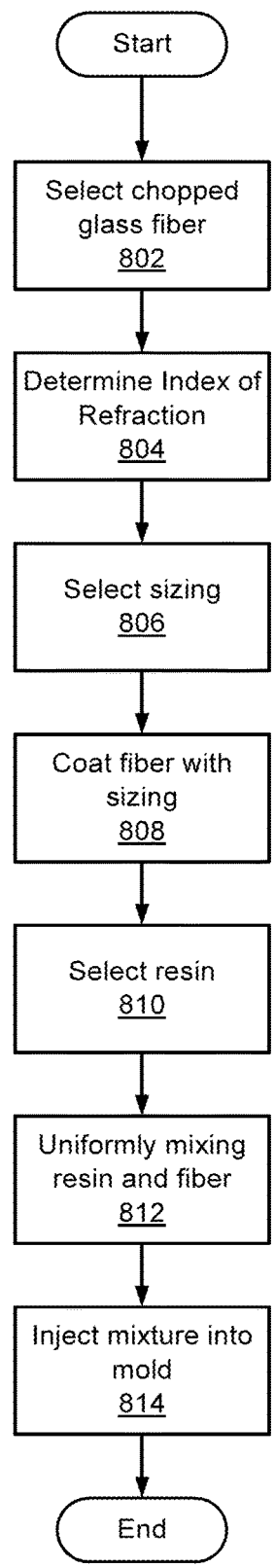
FIG. 8 is a flow chart of method steps for forming a relatively transparent injection molded part.

FIG. 8 is a flow chart of method steps 800 for forming a relatively transparent injection molded part. The method begins in step 802 when a chopped glass fiber is selected. Chopped glass fibers can be selected for relative clarity. In one embodiment, selected chopped glass fibers can be selected to be largely colorless by including a relatively amount of low iron oxide content. In another embodiment, the iron oxide content can be less than 0.1% by volume. In step 804, the index of refraction of chopped glass fibers can be determined. Oftentimes, the index of refraction can be determined through the manufacturer of the chopped glass fibers, through a data sheet, for example. In other embodiments, the chopped glass fibers can be tested with well known methods to determine the index of refraction. In step 806, sizing 405 for the chopped glass fibers can be selected. In one embodiment, the index of refraction of sizing 405 can be within a predetermined tolerance amount of the index of refraction of the selected chopped glass fiber. In step 808, sizing 405 can be applied to the chopped glass fiber. The sizing 405 can be selected to have a relatively similar index of refraction with respect to the selected chopped glass fiber. In one embodiment, the index of refraction of the sizing 405 can be similar to the index of refraction of the glass fiber, within a predetermined amount.

In step 810, a resin can be selected for the composite. In one embodiment, the index of refraction of resin 402 can be similar to the index of refraction of the chopped glass fiber 404 and sizing 405, within a predetermined tolerance amount. In another embodiment, resin 402 can be relatively clear and without tint or pigment. In step 812, resin 402 can be uniformly mixed with the chopped glass fiber 404. Even distribution of the chopped glass fiber within resin 402 can help improve the clarity of a resulting injection molded part. In step 814, resin 402 and chopped glass fiber mixture can be injected into a mold to form a transparent injection molded composite part and the method ends. Although the process above is described with respect to chopped fibers used in injection molding, the process can use milled fibers in place of chopped fibers. In some embodiments, milled fibers may be easier to injection mold in contrast to chopped fibers. The selection of milled fibers in preference to chopped fibers can be, in some embodiments, determined by particular injection mold designs. For example, some designs with sharp radii may not support the chopped fibers as well. In either case, uniform mixing of the chopped fibers/milled fibers within the selected resin can be important to obtain a uniformly transparent appearance with injection molded parts.

Although the composites described in FIGS. 4 and 5 as well as the methods described in FIGS. 7 and 8 were directed specifically toward glass fibers, those skilled in the art will recognize that other fibers can be used with similar results. For example ceramic fibers can also be used to form transparent composites. Selected ceramic fibers should be relatively clear and the selected resin and sizing (if required) should have an index of refraction similar to the index of refraction of the selected fiber. In embodiments where other components can be required to accompany the selected fiber within the resin, the index of refraction of the other components should be similar to the index of refraction of the selected fiber.

Figure 9:
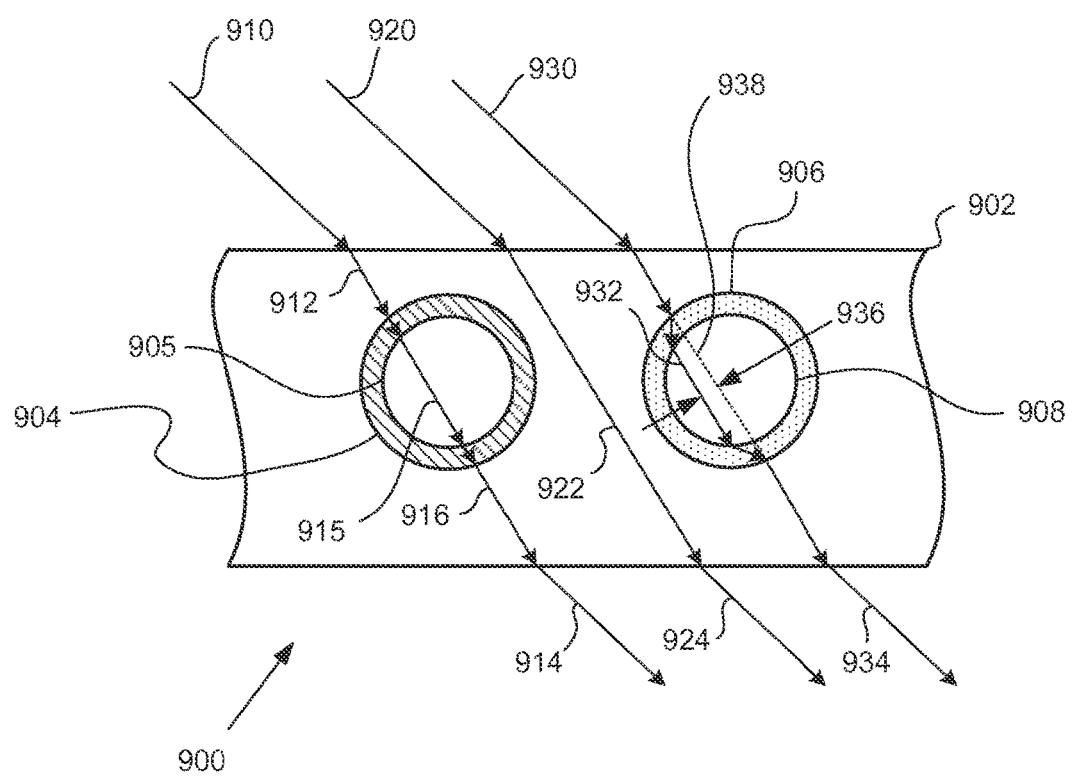
FIG. 9 is a simplified illustration comparing light ray paths through different fibers in a composite.

FIG. 9 is a simplified illustration 900 comparing different light rays traveling through a composite. A first pathway can be related to a light ray passing through resin 902 with no impediments. Light ray 920 can enter resin 902 and can bend a first amount forming light ray 922. Light ray 922 can continue through resin 902. As light ray exits resin 902, light ray 924 can be formed bending a second amount. A second pathway can be related to a light ray 910 passing through resin 902 and at least one fiber 905 coated with a sizing 904 where both the sizing 94 and the resin 902 include a similar index of refraction with respect to resin 902. Thus, light ray 910 can enter resin 902 and bend the first amount (i.e., the light ray 912 can bend a substantially similar amount with respect to light ray 922). Since sizing 904 and resin 902 both have indices of refraction similar to the index of refraction of resin 902, the path of light ray remains relatively straight shown by light rays 915 and 916. Light ray 916 can exit resin 902 forming light ray 914. A comparison of light ray 922 and combined light ray 912, 915 and 916 shows relatively parallel pathways.

If the indices of refraction of a sizing and a fiber are not substantially similar to the index of refraction of resin 902, overall relative clarity of resin 902 can still be maintained provided the indices of refraction of sizing 906 and fiber 908 do not deviate too far from the index of refraction of resin 902. For example, fiber 908 and sizing 906 can both have an index of refraction different from the index of refraction of resin 902. The differing indices of refraction can affect light path as shown. Light ray 930 can enter resin 902 and bend the first amount. As the light ray continues through sizing 906, fiber 908 and back through sizing 906, light ray 932 deviates from the relatively straight path shown as light ray 915. The error between straight light ray 915 and light ray 932 is shown as difference 936. In some embodiments, if sizing 906 and fiber 908 have non-similar indices of refraction compared to resin 902 and themselves, a relatively transparent composite can still be formed when the difference 936 is less than a predetermined amount.

Figure 10:
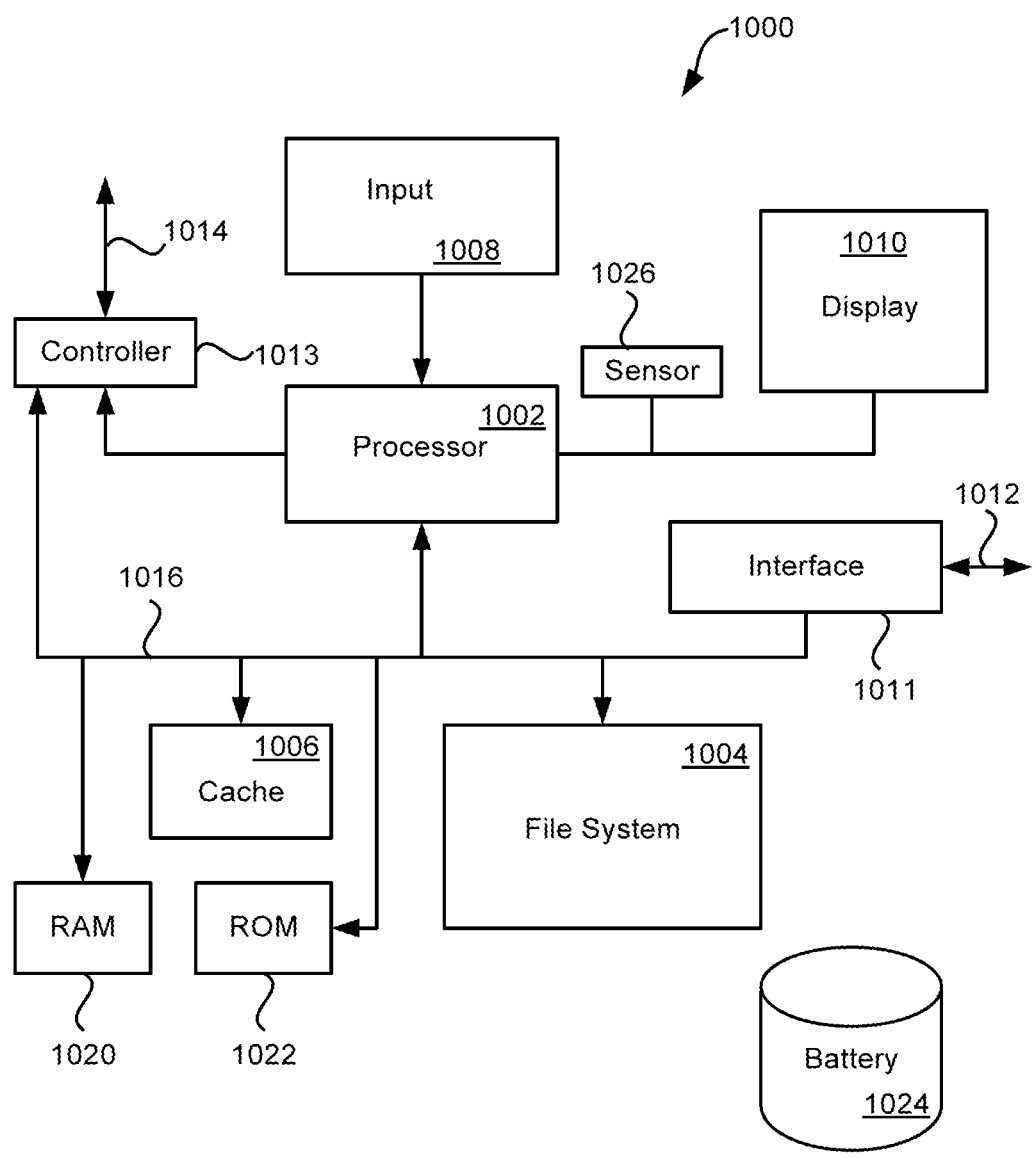
FIG. 10 is a block diagram of an electronic device suitable for controlling some of the processes in the described embodiments.

FIG. 10 is a block diagram of an electronic device suitable for controlling some of the processes in the described embodiment. Electronic device 1000 can illustrate circuitry of a representative computing device. Electronic device 1000 can include a processor 1002 that pertains to a microprocessor or controller for controlling the overall operation of electronic device 1000. Electronic device 1000 can include instruction data pertaining to manufacturing instructions in a file system 1004 and a cache 1006. File system 1004 can be a storage disk or a plurality of disks. In some embodiments, file system 1004 can be flash memory, semiconductor (solid state) memory or the like. The file system 1004 can typically provide high capacity storage capability for the electronic device 1000. However, since the access time to the file system 1004 can be relatively slow (especially if file system 1004 includes a mechanical disk drive), the electronic device 1000 can also include cache 1006. The cache 1006 can include, for example, Random-Access Memory (RAM) provided by semiconductor memory. The relative access time to the cache 1006 can substantially shorter than for the file system 1004. However, cache 1006 may not have the large storage capacity of file system 1004. Further, file system 1004, when active, can consume more power than cache 1006. Power consumption often can be a concern when the electronic device 1000 is a portable device that is powered by battery 1024. The electronic device 1000 can also include a RAM 1020 and a Read-Only Memory (ROM) 1022. The ROM 1022 can store programs, utilities or processes to be executed in a non-volatile manner. The RAM 1020 can provide volatile data storage, such as for cache 1006.

Electronic device 1000 can also include user input device 1008 that allows a user of the electronic device 1000 to interact with the electronic device 1000. For example, user input device 1008 can take a variety of forms, such as a button, keypad, dial, touch screen, audio input interface, visual/image capture input interface, input in the form of sensor data, etc. Still further, electronic device 1000 can include a display 1010 (screen display) that can be controlled by processor 1002 to display information to the user. Data bus 1016 can facilitate data transfer between at least file system 1004, cache 1006, processor 1002, and controller 1013. Controller 1013 can be used to interface with and control different manufacturing equipment through equipment control bus 1014. For example, control bus 1014 can be used to control a computer numerical control (CNC) mill, a press, an injection molding machine or other such equipment. For example, processor 1002, upon a certain manufacturing event occurring, can supply instructions to control manufacturing equipment through controller 1013 and control bus 1014. Such instructions can be stored in file system 1004, RAM 1020, ROM 1022 or cache 1006.

Electronic device 1000 can also include a network/bus interface 1011 that couples to data link 1012. Data link 1012 can allow electronic device 1000 to couple to a host computer or to accessory devices. The data link 1012 can be provided over a wired connection or a wireless connection. In the case of a wireless connection, network/bus interface 1011 can include a wireless transceiver. Sensor 1026 can take the form of circuitry for detecting any number of stimuli. For example, sensor 1026 can include any number of sensors for monitoring a manufacturing operation such as for example a Hall Effect sensor responsive to external magnetic field, an audio sensor, a light sensor such as a photometer, computer vision sensor to detect clarity, a temperature sensor to monitor a molding process and so on.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for forming a housing for an electronic device, the housing including a transparent fiber-resin composite, the method comprising:
    coating a first sizing on a first group of glass fibers and a second sizing on a second group of glass fibers, the first sizing having a first index of refraction and the second sizing having a second index of refraction that is different than the first index of refraction;
    applying a resin having a third index of refraction, different from the first index of refraction and second index of refraction, to the first group coated with the first sizing and the second group coated with the second sizing, wherein indexes of refraction of the first sizing, the second sizing, the resin, the first group, and the second group are within 0.005 of each other.

2. The method as recited in claim 1, further comprising:
bundling the coated first group and the coated second group into a tow having a predetermined diameter, wherein the predetermined diameter of the tow is chosen such that the resin wets the coated first group and the coated second group.

3. The method as recited in claim 2, wherein the index of refraction of the first group and the second group is about 1.55.

4. The method as recited in claim 2, wherein an average diameter of first group and the second group is 12 micrometers or less.

5. The method as recited in claim 4, wherein the average diameter is between 6 and 7 micrometers.

6. The method as recited in claim 1, wherein the first group and the second group are comprised of a silica glass characterized as having less than 0.1% iron oxide by volume.

7. The method of claim 1, wherein the first group of glass fibers and the second group of glass fibers have an average length of less than 0.25 inches.

8. A housing for an electronic device, the housing including a transparent fiber-resin composite, the transparent fiber-resin composite comprising:
a first portion of glass fibers coated with a first sizing and a second portion of glass fibers coated with a second sizing, the first sizing having a first index of refraction and the second sizing having a second index of refraction that is different than the first index of refraction, the coated first portion of glass fibers and the coated second portion of glass fibers encased within a resin having a third index of refraction, different from the first index of refraction and second index of refraction, wherein indexes of refraction of the first sizing, the second sizing, the resin, the first portion, and the second portion are within 0.005 of each other.

9. The housing of claim 8, wherein the first portion and the second portion are comprised of a silica glass characterized as having less than 0.1% iron oxide by volume.

10. The housing of claim 8, wherein the first portion and the second portion are comprised of milled glass fibers.

11. The housing of claim 10, wherein the first portion and the second portion have an average length of less than 0.25 inches.

12. The housing of claim 8, wherein the first portion and the second portion are bundled in a tow.

13. The housing of claim 8, wherein an average diameter of first group and the second group is 12 micrometers or less.

14. A method for forming a housing for an electronic device, the housing including a transparent fiber-resin composite, the method comprising:
coating a first sizing to a first group of milled glass fiber and a second sizing to a second group of milled glass fiber, the first group and the second group comprised of a silica glass characterized as having less than 0.1% iron oxide by volume;
forming a composite mixture by mixing the coated first group and the coated second group with a resin, wherein indexes of refraction of the first sizing, the second sizing and the resin are all different and indexes of refraction of the first sizing, the second sizing, the resin, the first group, and the second group are within 0.005 of each other; and
forming the transparent fiber-resin composite by injecting the composite mixture into a mold, the mold having a feature with a predetermined radius, wherein the mixing and the injecting are performed such that the coated first group and the coated second group are uniformly distributed within the transparent fiber-resin composite, and wherein an average length first group and the second group of milled glass fiber is chosen so as to uniformly distribute the coated first group and the coated second group within the feature during the injecting.

15. The method of claim 14, wherein the index of refraction of the first sizing is not equal to the index of refraction of the second sizing.

16. The method of claim 14, wherein an average diameter of the first group of glass fibers and the second group of glass fibers is less than 12 micrometers.

17. The method of claim 9, wherein the resin does not include pigments.

* * * * *